(12) United States Patent
Darr et al.

(10) Patent No.: US 7,825,766 B2
(45) Date of Patent: Nov. 2, 2010

(54) TOUCH SAFE FUSE MODULE WITH AMPACITY REJECTION

(75) Inventors: Matthew R. Darr, Godfrey, IL (US); Robert Stephen Douglass, Wildwood, MO (US)

(73) Assignee: Cooper Technologies Company, Houston, TX (US)

( * ) Notice: Subject to any disclaimer, the term of this patent is extended or adjusted under 35 U.S.C. 154(b) by 98 days.

(21) Appl. No.: 12/179,811

(22) Filed: Jul. 25, 2008

(65) Prior Publication Data

US 2010/0019878 A1 Jan. 28, 2010

(51) Int. Cl.
*H01H 85/24* (2006.01)
(52) U.S. Cl. .................. 337/198; 337/186; 337/187
(58) Field of Classification Search .......... 337/198, 337/186, 187; *H01H 85/24*
See application file for complete search history.

(56) References Cited

U.S. PATENT DOCUMENTS

| | | | | |
|---|---|---|---|---|
| 3,815,072 A | * | 6/1974 | Di Marco et al. | 337/226 |
| 3,890,032 A | * | 6/1975 | Tillson | 439/831 |
| 3,960,435 A | | 6/1976 | Bailey et al. | |
| 3,984,801 A | | 10/1976 | Mrenna et al. | |
| 4,037,917 A | * | 7/1977 | Clement | 439/831 |
| 4,108,531 A | | 8/1978 | Reynolds | |
| 4,178,063 A | | 12/1979 | Reynolds | |
| 4,188,002 A | | 2/1980 | Gilcher | |
| 4,257,662 A | * | 3/1981 | Motten, Jr. | 439/831 |
| 4,278,316 A | | 7/1981 | White | |
| RE30,862 E | | 2/1982 | Mrenna et al. | |
| 4,344,058 A | | 8/1982 | Knapp, Jr. et al. | |
| 4,488,767 A | | 12/1984 | Lehman et al. | |
| 4,613,195 A | * | 9/1986 | Suher et al. | 439/166 |
| 4,761,148 A | | 8/1988 | Sappington | |
| 4,775,338 A | | 10/1988 | Norden | |
| 4,782,317 A | | 11/1988 | Thwaites | |
| 4,846,738 A | | 7/1989 | Herbert | |
| RE33,877 E | | 4/1992 | Sappington | |
| 5,841,337 A | | 11/1998 | Douglass | |
| D427,569 S | | 7/2000 | Douglass et al. | |
| D427,976 S | | 7/2000 | Douglass et al. | |
| D429,223 S | | 8/2000 | Douglass et al. | |
| 6,157,287 A | | 12/2000 | Douglass et al. | |
| 6,650,222 B2 | | 11/2003 | Darr et al. | |
| 6,759,939 B2 | * | 7/2004 | Sudan et al. | 337/211 |
| 6,781,503 B1 | * | 8/2004 | Kubota | 337/230 |
| 6,794,979 B2 | * | 9/2004 | Sudan et al. | 337/211 |
| 7,355,503 B2 | * | 4/2008 | Buettner | 337/211 |
| 2001/0027060 A1 | * | 10/2001 | Kondo et al. | 439/620 |

FOREIGN PATENT DOCUMENTS

| | | | | |
|---|---|---|---|---|
| JP | 09283003 A | * | 10/1997 | |
| JP | 2000011850 A | * | 1/2000 | |
| JP | 2001250466 A | * | 9/2001 | |
| JP | 2009129671 A | * | 6/2009 | |

* cited by examiner

*Primary Examiner*—Anatoly Vortman
(74) *Attorney, Agent, or Firm*—Armstrong Teasdale LLP

(57) ABSTRACT

A fuse and fuse module that facilitate ampacity rejection based on electrical contact location is disclosed. A configuration of electrical contacts in the fuse and a corresponding configuration of fuse slots in the fuse holder permit fuses within an acceptable range of ampacities to be installed in the fuse holder while at the same time preventing fuses within an unacceptable range of ampacities from being installed in the fuse holder.

26 Claims, 14 Drawing Sheets

TOUCH SAFE FUSE MODULE WITH AMPACITY REJECTION

TECHNICAL FIELD

The invention relates generally to fuses and fuse modules. More particularly, the invention relates to fuses and fuse modules that facilitate ampacity rejection of a fuse based on the configuration of fuse terminals and fuse slots.

BACKGROUND

Fuse modules provide a means for fuses to be incorporated into an electrical system. A particular fuse module is rated to provide a specified amount of overcurrent protection such that a fuse installed in the fuse module opens when exposed to current above the rated amount. However, a fuse with the correspondingly proper ampacity must be installed in the fuse module to protect the electrical system properly.

Conventional fuse modules are designed for use with a fuse that is physically compatible with the fuse holder. Certain fuse modules will accept only the fuse having the proper rating that matches the fuse module. Accordingly, a fuse having a lower ampacity than the rating of the fuse module cannot be used in the fuse module, even in an emergency. Other fuse modules will accept multiple fuses, regardless of fuse ampacity. As a result, a fuse of the incorrect ampacity may be installed in a fuse holder. If the ampacity of the installed fuse is too low with regard to the ampacity for the protected circuit, then the electrical system is still protected, but the overcurrent protection may be too sensitive. If the ampacity of the installed fuse is too high with regard to the ampacity for the protected circuit, then the electrical system might allow too much current, which can damage the electrical circuit or equipment protected in the electrical circuit or can injure a person near the circuit.

Typically, a fuse module relies on users to ensure a fuse with the proper ampacity is installed in the fuse holder. Previous fuse holders have only been able to restrict fuse installation based on the size of the fuse being installed where the fuse was rejected if it was too large to fit in the fuse holder. A fuse holder that selectively rejects fuse installation based on the fuse terminal configuration does not exist.

Therefore, a need exists in the art for a fuse and fuse holder system, whereby a fuse holder receives fuses of a certain specified ampacity, accepts fuses with a lower ampacity, and rejects fuses with a higher ampacity.

SUMMARY

The invention relates generally to a set of fuse holders and corresponding fuses for installation in an electrical system. Each fuse holder in the set has a maximum current rating to provide current protection in an electrical system up to that rating. Each fuse in the set also has a maximum current rating to provide current protection in the electrical system up to that rating. The set of fuse holders and fuses are configured such that each fuse holder will accept a fuse from the set that has the maximum current rating for the fuse holder, will accept a fuse from the set that has a rating that is less then the maximum current rating for the fuse holder, and will not accept a fuse from the set that has a rating that is higher than the maximum current rating for the fuse holder. This lower rating fuse compatibility and higher rating fuse incompatibility ensures that a fuse of a specified ampacity will be used in a fuse holder while also allowing a fuse of a lower ampacity to be used. This interoperability is facilitated by a configuration of fuse terminals and fuse slots or a size configuration of fuse holders and fuses.

Each of the fuses in the set may have one of multiple current ratings while maintaining the same case size. Where fuses of different ampacities are manufactured in cases of the same size, the fuse terminals may be in an area defined by the location of the fuse terminals of the fuse with the highest ampacity for a particular case size. The size and location of the fuse terminals are then designed such that the area, or footprint, of a lower ampacity fuse fits within the area of the fuse terminals of the fuse with the next highest current ampacity. This process is repeated until the fuse with the highest ampacity for a case size is reached. This configuration allows a fuse of a lower ampacity to be used in the place of a fuse of a higher ampacity while preventing a fuse with too high of an ampacity from being used in a fuse holder having a lower ampacity. An additional feature involves the offset of fuse terminals within the footprint of the fuse of the next highest ampacity, which provides an additional level of protection to ensure fuses of the correct ampacity range are used.

For another aspect of the invention, the fuses and fuse holders previously described may be used together to ensure a minimal fuse rating is achieved. The invention can prevent fuses that exceed the rated ampacity of the fuse holder from being installed in the fuse holder. This mechanism ensures that the fuse fails before damage occurs to the circuit the fuse holder is protecting.

For another aspect of the invention, fuse holders may be designed to make use of these various forms of ampacity rejection in the fuses. Additionally, these fuse holders may be backward compatible with other fuses currently existing on the market. This feature is accomplished by designing the fuse holders to utilize both the disclosed ampacity rejection fuses and other known forms of fuse rejection.

For another aspect of the invention, the fuse terminals of the fuse may be oriented in a manner other than parallel. In an exemplary embodiment, the fuse terminals may be perpendicular to each other. The ampacity rejection feature may be accomplished by the size and location of one or more of the fuse terminals.

These and other aspects, objects, and features of the invention will become apparent to those having ordinary skill in the art upon consideration of the following detailed description of exemplary embodiments exemplifying the best mode for carrying out the invention as presently perceived.

BRIEF DESCRIPTION OF THE DRAWINGS

For a complete understanding of the invention and the advantages thereof, reference is now made to the following description in conjunction with accompanying figures in which:

FIG. 15a illustrates a fuse with perpendicular fuse terminals of a first ampacity where the ampacity of the fuse is determined by the width of the horizontal fuse terminal according to one exemplary embodiment;

Figure 1:
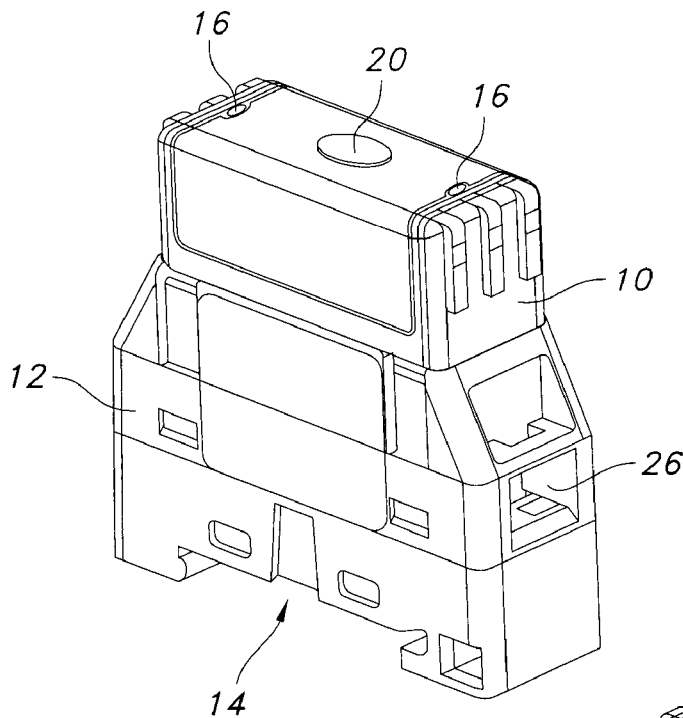
FIG. 1 is a perspective view of a fuse system according to an exemplary embodiment.

The appended drawings illustrate only exemplary embodiments of this invention and are therefore not to be considered limit of its scope, as the invention may admit other equally effective embodiments.

DETAILED DESCRIPTION

The invention may be better understood by reading the following description of non-limitative embodiments with reference to the attached drawings wherein like parts of each of the figures are identified by the same reference characters.

Figure 2:
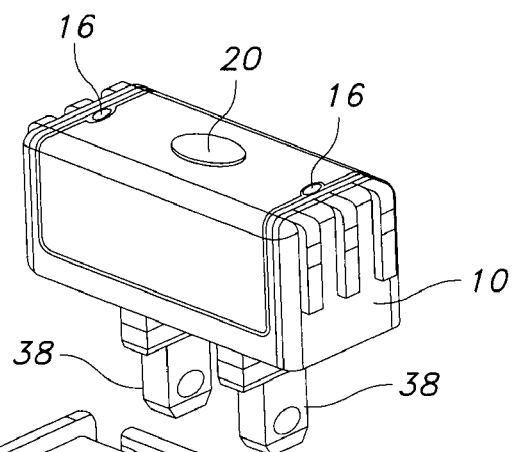
FIG. 2 is a perspective view of the exemplary embodiment illustrated in FIG. 1 with the fuse separated from the fuse holder.
Figure 2:
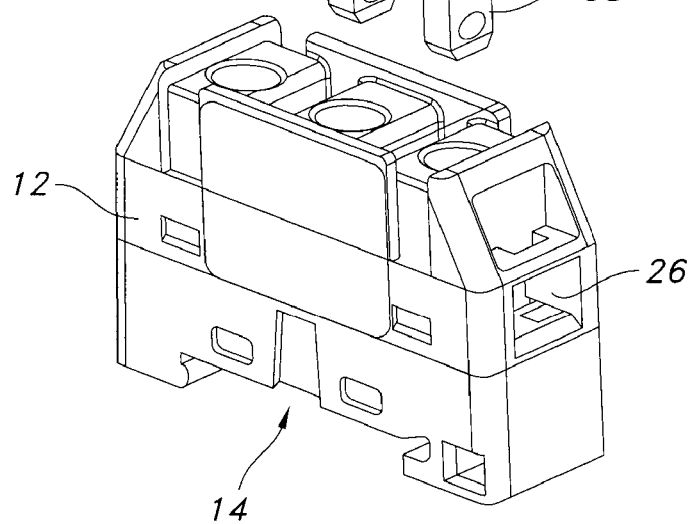

An exemplary fuse and fuse holder will be described with reference to FIGS. 1 and 2. FIG. 1 is a perspective view of a fuse 10 engaged with a fuse holder 12 according to an exemplary embodiment. FIG. 2 is a perspective view of the exemplary embodiment illustrated in FIG. 1, with the fuse 10 separated from the fuse holder 12.

The fuse holder 12, as illustrated, comprises a DIN rail holder 14 that may couple to a standard 35 millimeter DIN rail. However other configurations for mounting the fuse holder 12 within an electrical circuit are suitable and are within the scope of the invention. The fuse holder 12 can be suitable for connecting to two conductors for completing a circuit through the fuse 10.

The fuse 10 comprises an internal fuse element (not illustrated) coupled the fuse terminals 38 extending from the fuse 10.

The fuse 10 includes an optional open fuse indicator 20 mounted at a top portion thereof. Any suitable open fuse indicator may be used with the fuse 10.

The fuse 10 also includes test probe contact points 16. The contact points 16 comprise openings in the fuse housing which enable test probes to be inserted through the fuse housing to contact the fuse element contained within the fuse housing. In an exemplary embodiment, the access points can comply with the IEC 60529 standard for an IP20 code rating.

The fuse holder is wired in a conventional manner by inserting a conductor (not illustrated) through the wiring port 26 in the exterior of the fuse holder 12 to electrically connect the conductor to one of the fuse blades 38. A second conductor (not illustrated) can be inserted through a second wiring port (not illustrated) in the opposite side of the fuse holder 12 to electrically connect the second conductor to the other fuse blade 38.

Each fuse 10 is made to a predetermined size for a specific range of current ratings, wherein a larger fuse 10 would correspond to a higher range of current rating according to an exemplary embodiment.

The openings in the fuse holder that receive the fuse terminals 38 of the fuse 10 are sized such that a fuse holder 12 which is designed for a predetermined current rating will accept a properly sized fuse having that current rating or a fuse having a smaller case size and correspondingly smaller current rating. However, the fuse holder 12 will not accept a fuse of a larger case size and correspondingly larger current rating.

Fuses may be rejected by a fuse holder based on the fuse possessing an improper ampacity. In an exemplary embodiment, ampacity rejection is accomplished by use of the physical configuration of the fuse terminals and corresponding fuse holder slots. While fuses and fuse holders in some examples are symmetrical, the invention also makes use of fuse terminals and fuse slots that are offset, or staggered, from each other. In staggering, fuse terminals and fuse slots reside in substantially the same location for a case size, regardless of the ampacity of the fuse, but the exact location allows for rejection of a fuse by the fuse holder. To facilitate ampacity rejection, as the ampacity range for the fuse or fuse holder changes, then the configuration of fuse terminals and fuse slots are changed. In an exemplary embodiment, the fuse slots are expanded in opposite direction from the centerline of the fuse case to stagger, as will be explained in the following examples.

In an exemplary embodiment, fuses with two different case sizes are disclosed. The first size cases may have a surface area that is the same for any fuse utilizing the first size case. In an exemplary embodiment, the fuse ratings available include 15 A, 20 A, and 30 A. A similar structure is used in the second size fuse cases. The second size fuse case has a greater surface area than the first size fuse case. In the exemplary embodiment, the second size fuse case can contain a 40 A, 50 A, or 60 A fuse. Those having ordinary skill in the art will realize that the invention described using this naming convention can be adapted to fuses of any current rating.

Figure 3A:
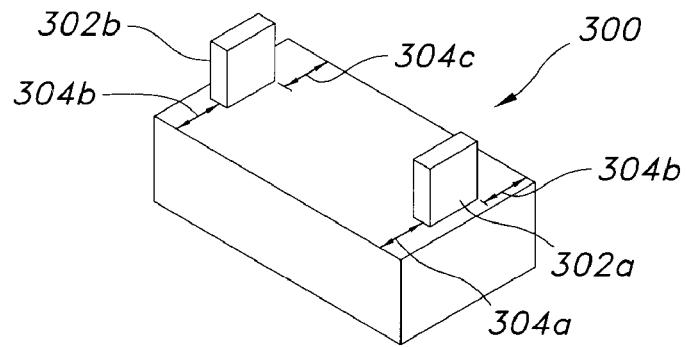
FIG. 3a is a perspective view of a 15 A fuse with 15 A fuse terminals of a first width centered on the ends of the 15 A fuse according to one exemplary embodiment.
Figure 3B:
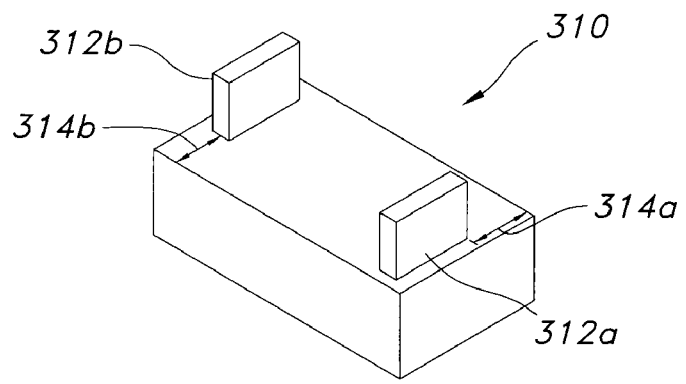
FIG. 3b is a perspective view of a 20 A fuse with 20 A fuse terminals having a second width offset from the longitudinal center of the ends of the 20 A fuse according to one exemplary embodiment.
Figure 3C:
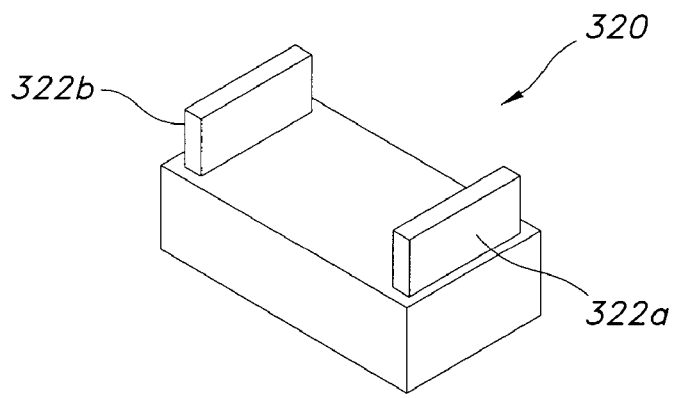
FIG. 3c is a perspective view of a 30 A fuse with 30 A fuse terminals of a third width centered on the ends of the 30 A fuse according to one exemplary embodiment.

Exemplary ampacity rejection features will now be described. FIGS. 3a-c are perspective views of the 15 A, 20 A, and 30 A fuses, respectively, with fuse terminals extending therefrom. As illustrated in the figures, the fuse terminals vary in width but remain in the area defined by the fuse terminals of the fuse with the highest ampacity for the case size.

FIG. 3a is a perspective view of a 15 A fuse 300 with 15 A fuse terminals 302a-302b of a first width centered on the ends of the 15 A fuse 300 according to one exemplary embodiment. In an exemplary embodiment, the 15 A fuse terminals 302a-b are offset from the sides by a 15 A fuse terminal offset 304a-d. The distances of 15 A fuse terminal offset 304a-d do not have to be equal.

FIG. 3b is a perspective view of a 20 A fuse 310 with 20 A fuse terminals 312a-b having a second width and being offset from the longitudinal center of the ends of the 20 A fuse 310 according to one exemplary embodiment. In an exemplary embodiment, the 20 A fuse terminals 312a-b have a greater width that the 15 A fuse terminals 302a-b and are offset from at least one side by a 20 A fuse terminal offset 314a-b. In the exemplary embodiment, the 20 A fuse terminal offset 314 is greater than 15 A fuse terminal offset 304. However, the 20 A fuse terminal offset 314 is applied only to a single side of the 20 A fuse terminals 312a-b. As a result, the upper 20 A fuse terminal 312b is closer to the right side as pictured, while the lower 20 A fuse terminal 312a is closer to the left side as pictured.

FIG. 3c is a perspective view of a 30 A fuse 320 with 30 A fuse terminals 322a-b having a third width and being centered on the ends of the 30 A fuse 320 according to one exemplary embodiment. In an exemplary embodiment, the 30 A fuse terminals 322a-b are not offset from the sides of the 30 A fuse 320.

Figure 4A:
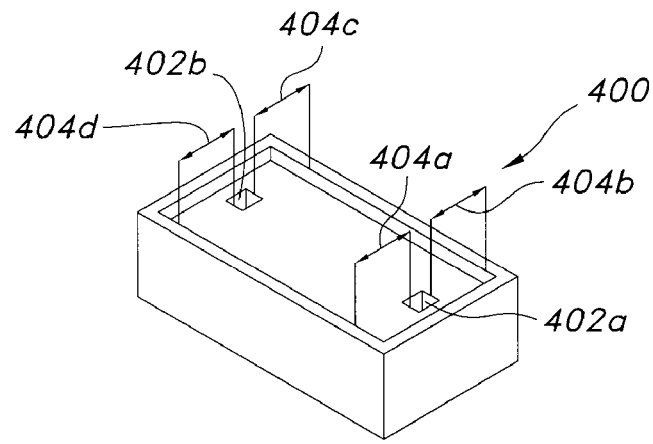
FIG. 4a illustrates a 15 A fuse holder with 15 A fuse slots of a first width centered on the ends of the 15 A fuse holder according to one exemplary embodiment.
Figure 4B:
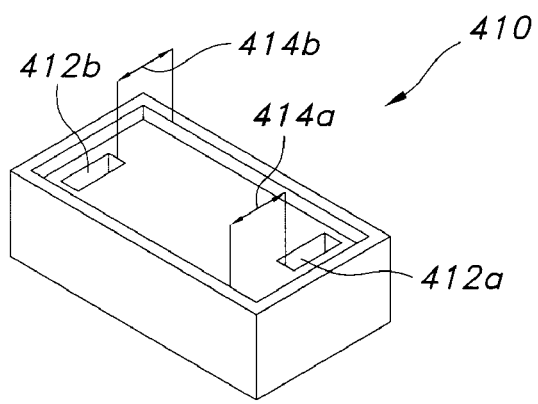
FIG. 4b illustrates a 20 A fuse holder with 20 A fuse slots having a second width offset from the center of the ends of the 20 A fuse holder according to one exemplary embodiment.
Figure 4C:
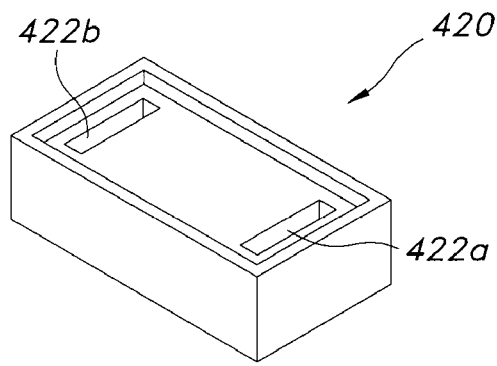
FIG. 4c illustrates a 30 A fuse holder with 30 A fuse slots of a third width centered on the ends of the 30 A fuse holder according to one exemplary embodiment.

FIGS. 4a-c show a perspective view of fuse holders for the fuses depicted in FIGS. 3a-c according to an exemplary embodiment. FIG. 4a illustrates a 15 A fuse holder 400 with 15 A fuse slots 402a-b having a first width and being centered on the ends of the 15 A fuse holder 400 according to one exemplary embodiment. In an exemplary embodiment, the 15 A fuse slots 402a-b are offset from the sides by a 15 A fuse slot offset 404a-d. The distances do not have to be equal to each other, but should be equal to the corresponding distance from the 15 A fuse 300. The fuse slots 402a-b correspond to the 15 A fuse terminals 302a-b, respectively.

FIG. 4b illustrates a 20 A fuse holder 410 with 20 A fuse slots 412a-b having a second width offset from the center of the ends of the 20 A fuse holder 410 according to one exemplary embodiment. In an exemplary embodiment, the 20 A fuse slots 412a-b have a second width greater than the width of the 15 A fuse slots 402 and are offset from the sides by a 20 A fuse terminal offset 414a-b. In the exemplary embodiment, the 20 A fuse slot offset 414 is greater than 15 A fuse slot offset 404. However, the 20 A fuse slot offset 414 is applied only to a single side of the 20 A fuse slots 412a-b. As a result, the upper 20 A fuse slot 412b is closer to the left side as pictured, while the lower 20 A fuse slot 412a is closer to the right side as pictured. The distances do not have to be equal depending on the embodiment. The fuse slots 412a-b correspond to the 20 A fuse terminals 312a-b, respectively.

FIG. 4c illustrates a 30 A fuse holder 420 with 30 A fuse slots 422a-b having a third width and being centered on the ends of the 30 A fuse holder 420 according to one exemplary embodiment. The fuse slots 422a-b correspond to the 30 A fuse terminals 322a-b, respectively.

As previously illustrated in FIG. 1, the fuses are inserted into fuse holders. The compatibility of the fuse with the respective fuse holders is based on the configuration of fuse terminals and fuse slots illustrated in FIGS. 3a-4c. FIGS. 5a-9c illustrate how the configurations of fuse terminals and fuse slots are used in an exemplary embodiment by illustrating the configuration, or footprint, of the fuse terminals and fuse slots when the fuses are inserted into the fuse slots.

Figure 5A:
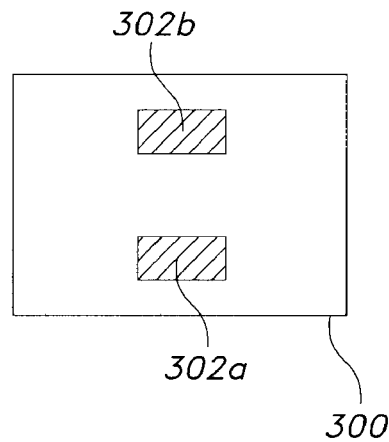
FIG. 5a illustrates a 15 A fuse with 15 A fuse terminals according to one exemplary embodiment.
Figure 5B:
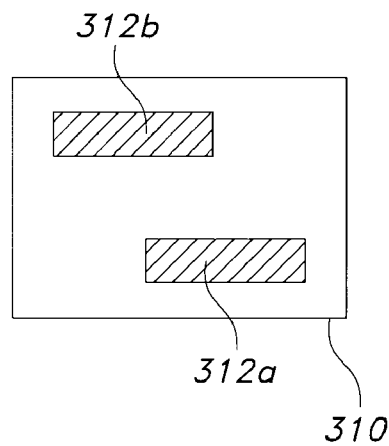
FIG. 5b illustrates a 20 A fuse with 20 A fuse terminals according to one exemplary embodiment.
Figure 5C:
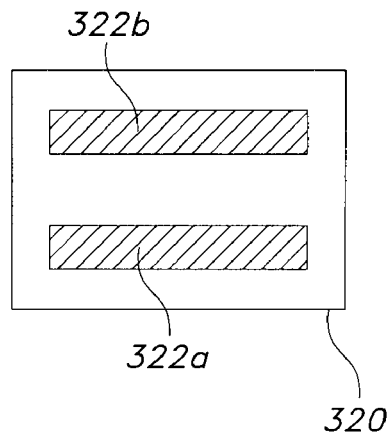
FIG. 5c illustrates a 30 A fuse with 30 A fuse terminals according to one exemplary embodiment.

FIGS. 5a-c illustrate a cross section of the fuses with emphasis on the location and dimensions of the fuse terminals. FIG. 5a illustrates the 15 A fuse 300 with 15 A fuse terminals 302a-b according to one exemplary embodiment. FIG. 5b illustrates the 20 A fuse 310 with 20 A fuse terminals 312a-b according to one exemplary embodiment. FIG. 5c illustrates the 30 A fuse 320 with 30 A fuse terminals 322a-b according to one exemplary embodiment.

As illustrated, the fuse terminals are located in an area defined by the largest area that would be occupied by the highest ampacity fuse for the associated case size. The fuses 300, 310, 320 have the same case size and would fit into a correspondingly sized fuse holder case. In an exemplary embodiment, the 30 A fuse 320 is the highest ampacity fuse available in a first sized case. The 15 A fuse 300 and 20 A fuse 310 are also available in the first sized case. The 15 A fuse terminals 302 and the 20 A fuse terminals 312 would reside within the same area as the 30 A fuse terminal 322, but would not occupy the entire area of the 30 A fuse terminals 322.

Figure 6A:
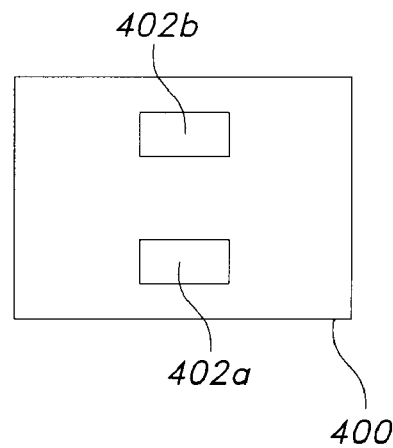
FIG. 6a illustrates a 15 A fuse holder with 15 A fuse slots according to one exemplary embodiment.
Figure 6B:
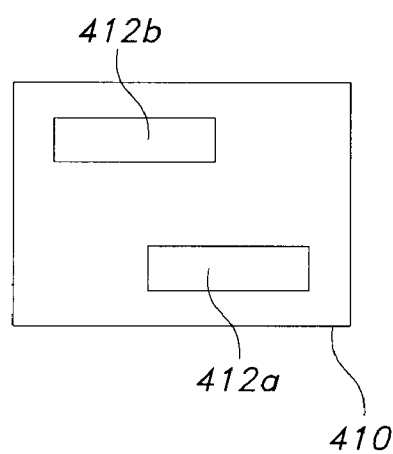
FIG. 6b illustrates a 20 A fuse holder with 20 A fuse slots according to one exemplary embodiment.
Figure 6C:
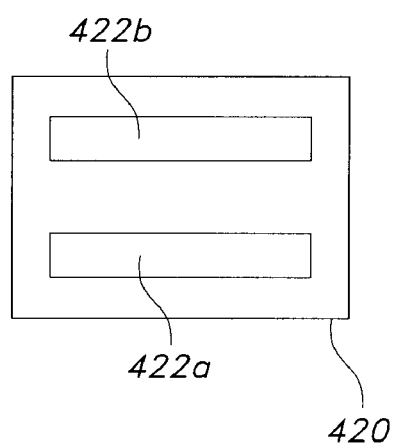
FIG. 6c illustrates a 30 A fuse holder with 30 A fuse slots according to one exemplary embodiment.

FIGS. 6a-c illustrate a cross section of the fuse holders with emphasis on the location and dimensions of the fuse slots according to an exemplary embodiment. FIG. 6a illustrates the 15 A fuse holder 400 with 15 A fuse slots 402a-b according to one exemplary embodiment. FIG. 6b illustrates the 20 A fuse holder 410 with 20 A fuse slots 412a-b according to one exemplary embodiment. FIG. 6c illustrates a 30 A fuse holder 420 with 30 A fuse slots 422a-b according to one exemplary embodiment.

As with the corresponding fuses, the fuse holders include fuse slots to receive fuse terminals, where the fuse slots are located in an area defined by the largest area that would be occupied by the fuse slots of the highest ampacity fuse with the associated case size. The fuse holders 400, 410, 420 have the same case size and would accept a correspondingly sized fuse case. In an exemplary embodiment, a 30 A fuse 320 is the highest ampacity fuse available in a first sized case. The 15 A fuse holder 400 and 20 A fuse holder 410 are also available in the first sized case. The 15 A fuse slots 402 and the 20 A fuse slots 412 reside within the same area as the 30 A fuse slots 422, but do not occupy the entire area as the 30 A fuse slots 422.

FIGS. 7a-9c illustrate how the previously illustrated fuses 300, 310, 320 and fuse holders 400, 410, 420 may interact with each other. These figures are meant to illustrate the compatibility of the fuses and the fuse holders according to an exemplary embodiment. The interaction of a fuse with a fuse holder occurs when the fuse terminals of a fuse are inserted into fuse slots of a fuse holder. If the fuse terminals of a particular fuse fit within the fuse slots of a particular fuse holder, then the particular fuse is compatible with the particular fuse holder. Compatibility is illustrated in the drawings by illustrating the area in a fuse slot that is filled by insertion of a fuse terminal (indicated by a filled in space in the drawings) and by illustrating the area in a fuse slot that is not filled by insertion of a fuse terminal (illustrated by an 'O' in the drawings). If the fuse terminals of a particular fuse do not fit within the fuse slots of a particular fuse holder, then the particular fuse is not compatible with the particular fuse holder. Incompatibility is illustrated in the drawings by illustrating the area of a fuse terminal that is larger than a fuse slot (illustrated by an 'X' in the drawings). This representation illustrates where the fuse terminals and fuse slots are operable based on a illustrating of compatibility or empty space. The empty space may be the result of extra space from staggered ampacity rejection (stagger space) or the result of extra space from width rejection (width space). Further, this representation may illustrate where a fuse is incompatible based on the presence of incompatibility (overlap) anywhere in the figure.

Figure 7A:
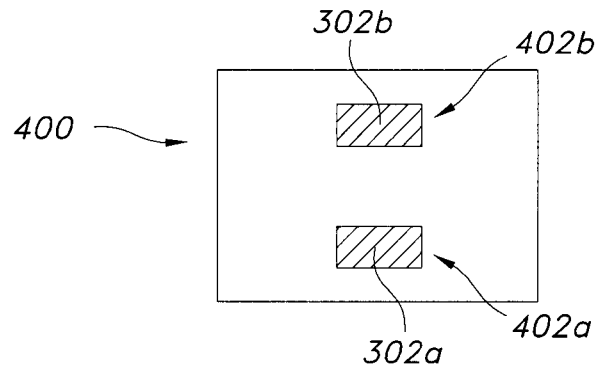
FIG. 7a is a diagram illustrating the interaction between a 15 A fuse and a 15 A fuse holder according to one exemplary embodiment.
Figure 7B:
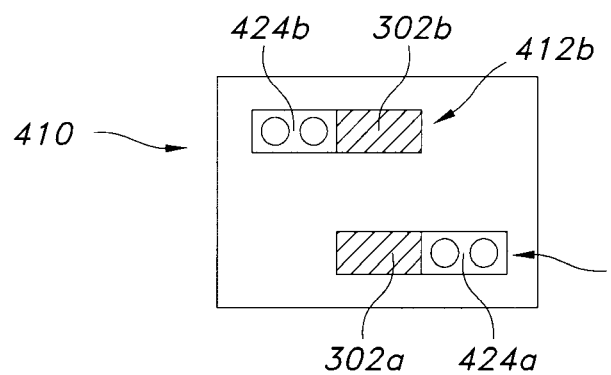
FIG. 7b is a diagram illustrating the interaction between a 15 A fuse and a 20 A fuse holder according to one exemplary embodiment.
Figure 7C:
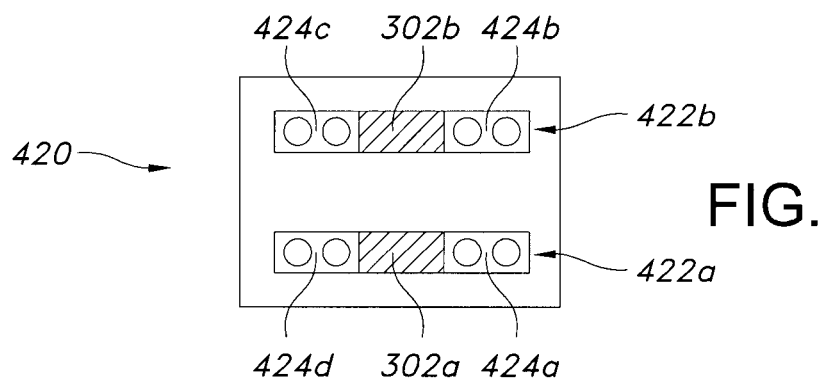
FIG. 7c is a diagram illustrating the interaction between a 15 A fuse and a 30 A fuse holder according to one exemplary embodiment.

FIGS. 7a-c illustrate the interaction between a 15 A fuse 300 and a 15 A fuse holder 400, a 20 A fuse holder 410, a 30 A fuse holder 420. FIG. 7a is a diagram illustrating the interaction between a 15 A fuse 300 and a 15 A fuse holder 400 according to one exemplary embodiment. FIG. 7b is a diagram illustrating the interaction between a 15 A fuse 300 and a 20 A fuse holder 410 according to one exemplary embodiment. FIG. 7c is a diagram illustrating the interaction between a 15 A fuse 300 and a 30 A fuse holder 420 according to one exemplary embodiment. For the purposes of clarity, the boundary of the fuse case and the boundary of the fuse holder are the same line in the drawings. As illustrated in FIG. 7a, the 15 A fuse terminals 302a-b fit in the 15 A fuse slots 402a-b. As illustrated in FIG. 7b, the 15 A fuse terminals 302a-b fit in the 20 A fuse slots 412a-b, but there is stagger space 424a-b that has not been occupied by the 15 A fuse terminals 302a-b. As illustrated in FIG. 7c, the 15 A fuse terminals 302a-b fit in the 30 A fuse slots 422a-b, but there is stagger space 424a-d that has not been occupied by the 15 A fuse terminals 302. Thus, they 15 A fuse 310 is compatible with the 15 A fuse holder 400, the 20 A fuse holder 410, and the 30 A fuse holder 420.

Figure 8A:
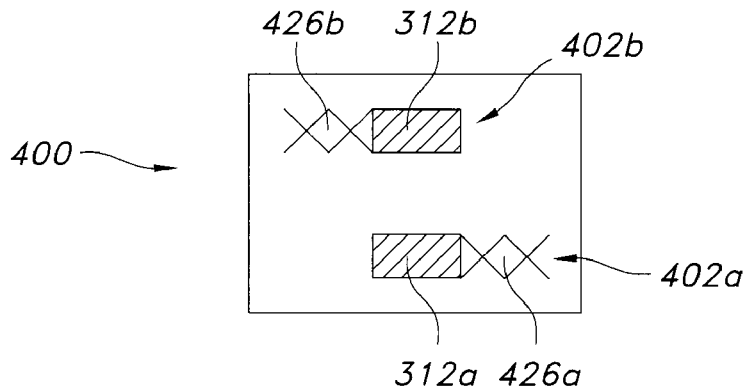
FIG. 8a is a diagram illustrating the interaction between a 20 A fuse and a 15 A fuse holder according to one exemplary embodiment.
Figure 8B:
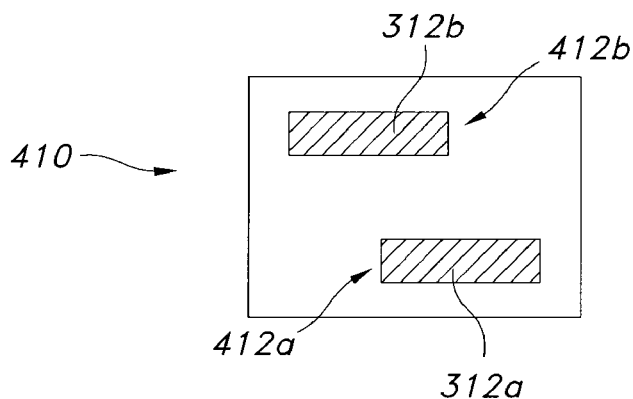
FIG. 8b is a diagram illustrating the interaction between a 20 A fuse and a 20 A fuse holder according to one exemplary embodiment.
Figure 8C:
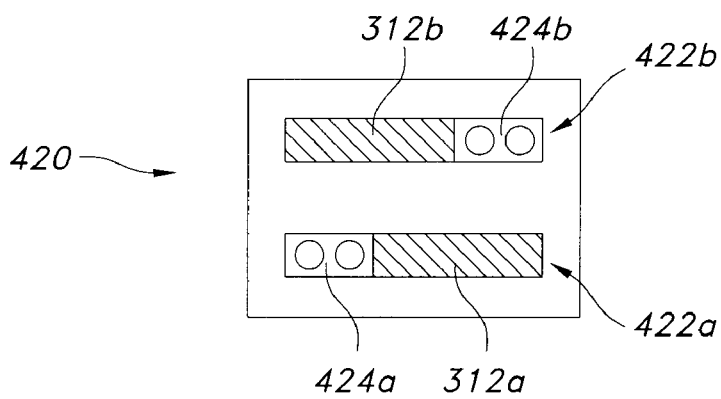
FIG. 8c is a diagram illustrating the interaction between a 20 A fuse and a 30 A fuse holder according to one exemplary embodiment.

FIGS. 8a-c illustrate the interaction between a 20 A fuse 310 and a 15 A fuse holder 400, a 20 A fuse holder 410, a 30 A fuse holder 420. FIG. 8a is a diagram illustrating the interaction between a 20 A fuse 310 and a 15 A fuse holder 400 according to one exemplary embodiment. FIG. 8b is a diagram illustrating the interaction between a 20 A fuse 310 and a 20 A fuse holder 410 according to one exemplary embodiment. FIG. 8c is a diagram illustrating the interaction between a 20 A fuse 310 and a 30 A fuse holder 420 according to one exemplary embodiment. For the purposes of clarity, the boundary of the fuse case and the boundary of the fuse holder are the same line in the drawings. As illustrated in FIG. 8a, the 20 A fuse terminals 312a-b do not fit in the 15 A fuse slots 402a-b. The 20 A fuse terminals 312a-b overhang by the area 426a-b that prevents the 20 A fuse terminals 312a-b from entering the 15 A fuse slots 402a-b. As illustrated in FIG. 8b, the 20 A fuse terminals 312a-b fit in the 20 A fuse slots 412a-b. As illustrated in FIG. 8c, the 20 A fuse terminals 312a-b fit in the 30 A fuse slots 422a-b, but there is a stagger space 424a-b in the 30 A fuse slots 422a-b that is not occupied by the 20 A fuse terminals 312a-b.

Figure 9A:
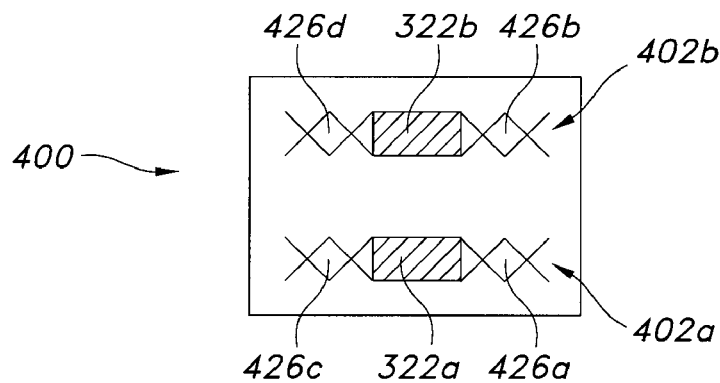
FIG. 9a is a diagram illustrating the interaction between a 30 A fuse and a 15 A fuse holder according to one exemplary embodiment.
Figure 9B:
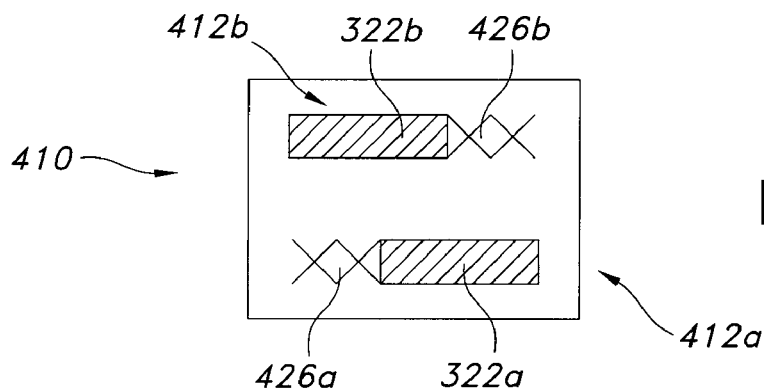
FIG. 9b is a diagram illustrating the interaction between a 30 A fuse and a 20 A fuse holder according to one exemplary embodiment.
Figure 9C:
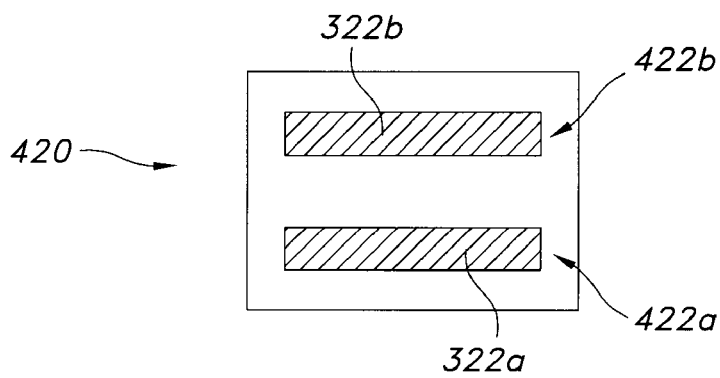
FIG. 9c is a diagram illustrating the interaction between a 30 A fuse and a 30 A fuse holder according to one exemplary embodiment.

FIGS. 9a-c illustrate the interaction between a 30 A fuse 320 and a 15 A fuse holder 400, a 20 A fuse holder 410, and a 30 A fuse holder 420. FIG. 9a is a diagram illustrating the interaction between a 30 A fuse 320 and a 15 A fuse holder 400 according to one exemplary embodiment. FIG. 9b is a diagram illustrating the interaction between a 30 A fuse 320 and a 20 A fuse holder 410 according to one exemplary embodiment. FIG. 9c is a diagram illustrating the interaction between a 30 A fuse 320 and a 30 A fuse holder 420 according to one exemplary embodiment. For the purposes of clarity, the boundary of the fuse case and the boundary of the fuse holder are the same line in the drawings. As illustrated in FIG. 9a, the 30 A fuse terminals 322a-b overhang the 15 A fuse slots 402a-b by an amount 426a-d that prevents the 30 A fuse terminals 322a-b from entering the 15 A fuse slots 402a-b. As illustrated in FIG. 9b, the 30 A fuse terminals 322a-b overhang the 20 A fuse slots 412a-b by an amount 426a-b that prevents the 30 A fuse terminals 322a-b from entering the 20 A fuse slots 412a-b. As illustrated in FIG. 9c, the 30 A fuse terminals 322a-b fit in the 30 A fuse slots 422a-b.

Accordingly, as illustrated in FIGS. 7a-9c, fuses can be "backward" compatible with fuse holders having a higher current rating than the fuse, but fuses are not "forward" compatible with fuse holders having a lower current rating than the fuse.

The arrangement of fuse slots in the fuse holders as described above also allow the fuse holders to maintain compatibility with other fuses on the market. Typical fuses have fuse terminals of a standard size, regardless of the current rating. This arrangement of fuse slots in the various fuse holders allows these fuses to be installed in the fuse holders to complete the circuit, albeit without the possible ampacity rejection features previously described.

FIGS. 10a-12b illustrate how the fuse terminal previously described may be combined with case size rejection. Case size rejection is a feature that can impact whether a fuse of a different set of ampacities from the rated ampacity of the fuse holder may be used based on the case size of the fuse. Case size rejection may occur in several manners. In one embodiment, the case size may allow the fuse terminals of the fuse to be at different positions in other case sizes. Another form of case size rejection involves the physical structure of the fuse being too large to allow installation of the fuse into a fuse holder, while at the same time allowing a fuse with a smaller case to be installed.

Figure 10A:
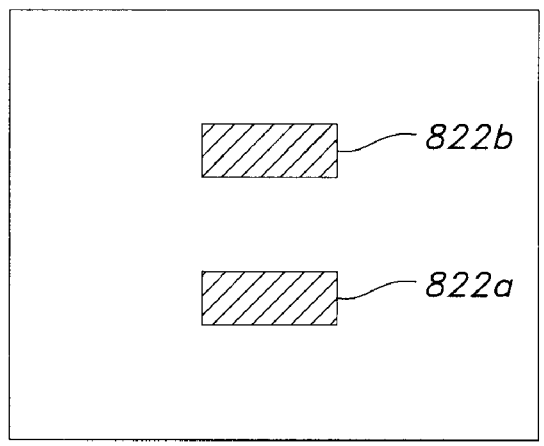
FIG. 10b illustrates a 40 A fuse holder with 40 A fuse slots according to one exemplary embodiment.
Figure 10B:
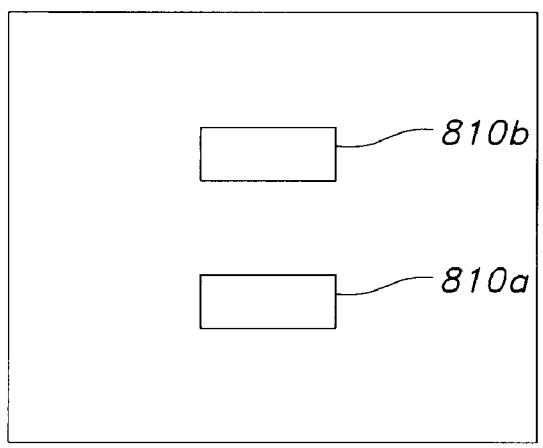

FIGS. 10a-b illustrate cross sections of a 40 A fuse 820 and a 40 A fuse holder 800. FIG. 10a illustrates a 40 A fuse 820 with 40 A fuse terminals 822a-b according to one exemplary embodiment. FIG. 10b illustrates a 40 A fuse holder 800 with 40 A fuse slots 810a-b according to one exemplary embodiment. The 40 A fuse 820 and fuse holder 800 will be used to illustrate case size rejection.

Figure 11A:
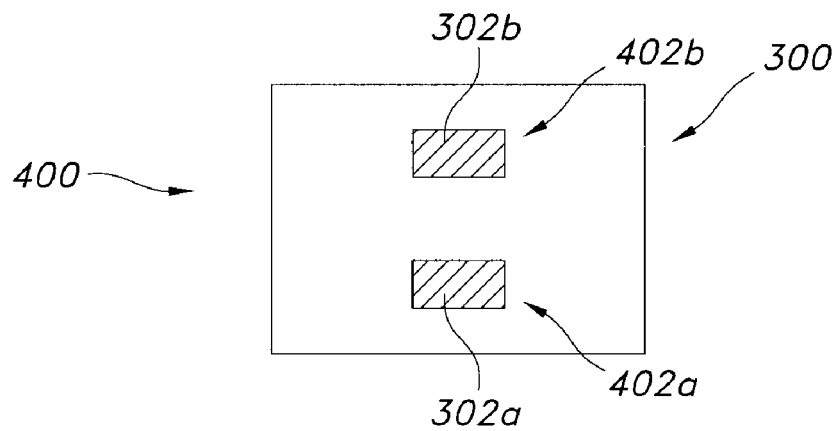
FIG. 11a is a diagram illustrating the interaction between a 15 A fuse and a 15 A fuse holder according to one exemplary embodiment.
Figure 11B:
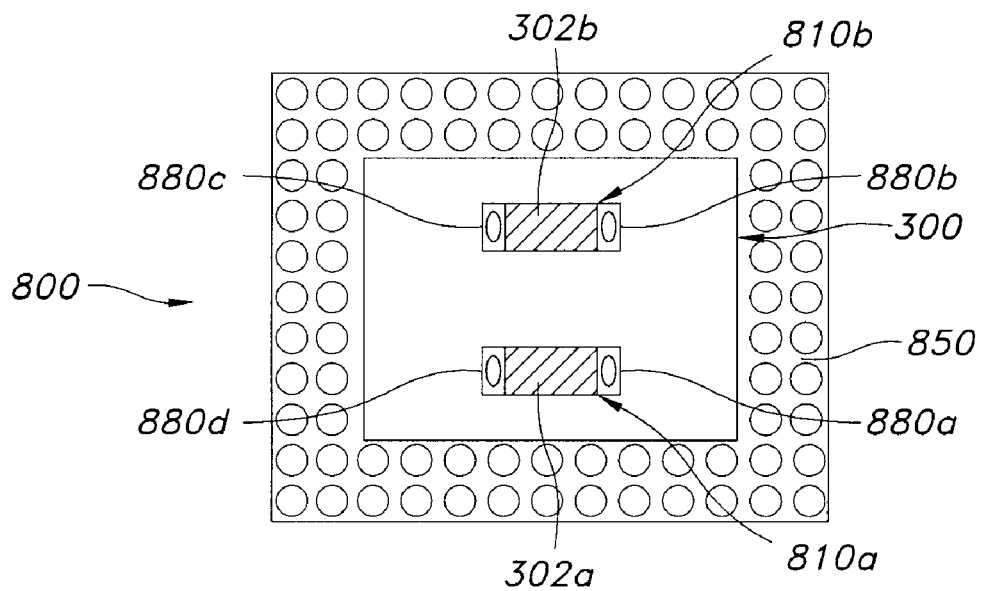
FIG. 11b is a diagram illustrating the interaction between a 15 A fuse and a 40 A fuse holder according to one exemplary embodiment.

As illustrated in FIGS. 11a-b, it is possible for a fuse with a smaller case size and smaller contact terminals to be used in a fuse holder for a larger fuse with a larger case and larger contact terminals. FIG. 11a is a diagram illustrating the interaction between a 15 A fuse 300 and a 15 A fuse holder 400 according to one exemplary embodiment. FIG. 11b is a diagram illustrating the interaction between a 15 A fuse 300 and a 40 A fuse holder 800 according to one exemplary embodiment. As illustrated in FIG. 11a, a 15 A fuse 300 may be used on a 15 A fuse holder 400, where the corresponding 15 A fuse terminals 302a-b and 15 A fuse slots 402a-b align. As illustrated in FIG. 11b, the 15 A fuse 300 may also couple to the 40 A fuse holder 800 in such a manner that the corresponding 15 A fuse terminals 302a-b align with the 40 A fuse slots 810a-b. An empty space 880a-d remains in the 40 A fuse slots 810a-b as a result of being designed for a 40 A fuse terminals 822. As a result of the smaller case size of the 15 A fuse 300, there is an empty space 850 (illustrated with the circles) that results. The space 850 is within the boundaries of the case of the fuse holder 800.

Figure 12A:
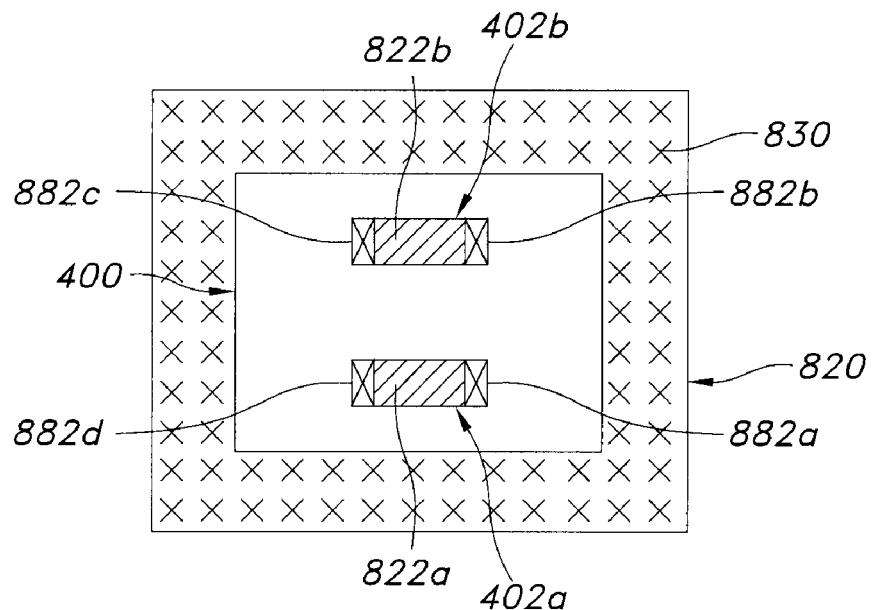
FIG. 12a is a diagram illustrating the interaction between a 40 A fuse and a 15 A fuse holder according to one exemplary embodiment.
Figure 12B:
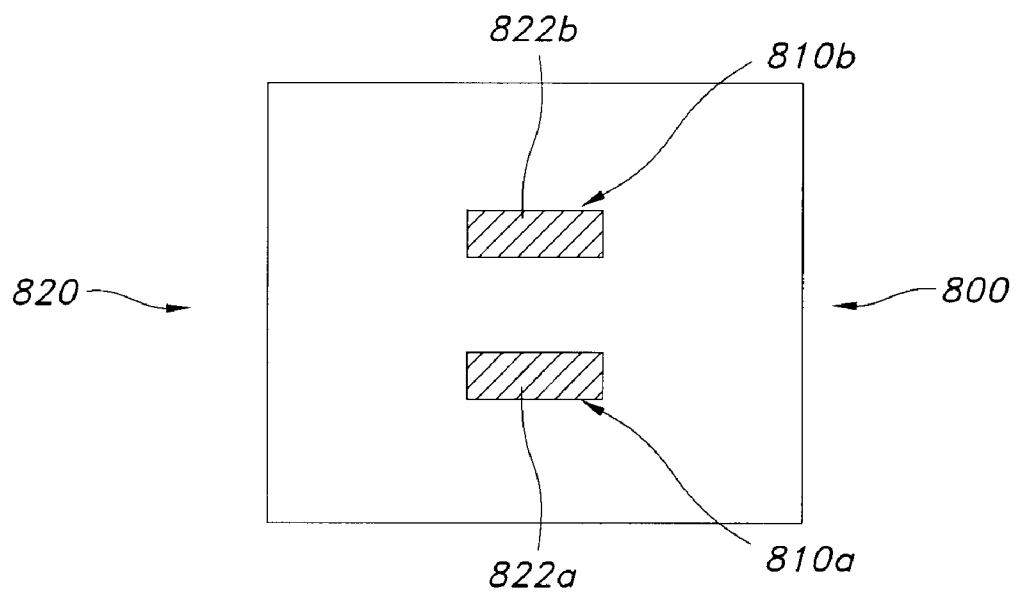
FIG. 12b is a diagram illustrating the interaction between a 40 A fuse and a 40 A fuse holder according to one exemplary embodiment.

As illustrated in FIGS. 12a-b, it is not possible to use a larger fuse with a smaller fuse holder according to an exemplary embodiment. FIG. 12a is a diagram illustrating the interaction between a 40 A fuse 820 and a 15 A fuse holder 400 according to one exemplary embodiment. FIG. 12b is a diagram illustrating the interaction between a 40 A fuse 820 and a 40 A fuse holder 800 according to one exemplary embodiment. As illustrated in FIG. 12a, a 40 A fuse 820 is to be inserted into a 15 A fuse holder 400. The 40 A fuse terminals 822a-b align with the 15 A fuse slots 402a-b. However, due to the large case size of the 40 A fuse 820, the 40 A fuse 820 overhangs the 15 A fuse holder 400 by an amount 830 (illustrated with each "X"), which prevents installation of the 40 A fuse 820 in the smaller 15 A fuse holder 400. Additionally, the 40 A fuse terminals 822a-b may be larger than the 15 A fuse slots 402a-b creating a terminal overhang 882a-d, which prevents installation of the 40 A fuse 820 in the smaller 15 A fuse holder 400. In this example, the 40 A fuse terminals 822a-b cannot engage the 15 A fuse slots 402a-b. As illustrated in FIG. 12b, the 40 A fuse can be inserted into a 40 A fuse holder 800, the 40 A fuse terminals 822a-b and the 40 A fuse slots 810a-b align since the terminals, slots, and case size are appropriately dimensioned.

While the preceding example shows how a 40 A fuse 820 is rejected by a 15 A fuse holder 400 based on the size of the contact terminals and fuse case size, it is also understood that a 40 A fuse 820 will be rejected by a 20 A fuse holder 410 and a 30 A fuse holder 420 based on contact terminal size and fuse case size.

Other forms of ampacity rejection also may be combined with the staggered fuse system while maintaining backward compatibility with previous forms of ampacity rejection. An alternative form of ampacity rejection may be based on the width of the fuse terminals (hereinafter "width fuses"). Instead of the fuse terminals and the corresponding fuse slots in the fuse holders becoming staggered, the fuse terminals and corresponding fuse slots remain centered on the longitudinal centerline and become progressively wider to accommodate fuses with different ampacities. It is possible to combine the width and staggered forms of ampacity rejection. If a fuse were to utilize width to indicate higher ampacity, then the fuse slot stagger configuration may by amended to maintain both forms of ampacity rejection to use older fuses. As a result, instead of simply creating the staggering effect by expanding a fuse slot in a single direction, the fuse slot may be extended in two directions to accommodate various forms of ampacity rejection (hereinafter "stagger and width fuse holders").

Although described previously with centered 15 A fuse terminals and fuse slots, staggered 20 A fuse terminals and fuse slots, and centered 30 A fuse terminals and fuse slots, other configurations are within the scope of the invention. For example, all of the fuse terminals and fuse slots can be centered with respect to the fuses and fuse holders. Alternatively, all of the fuse terminals and fuse slots can be offset to one side with respect to the fuses and the fuse holders. Or, all of the fuse terminals and fuse slots can have a staggered configuration (offset on both sides) with respect to the fuses and fuse terminals. In any event, the smaller fuse terminals of a lower ampacity fuse can be configured to be disposed within the larger fuse slots of a higher ampacity fuse holder, while larger fuse terminals of a higher ampacity fuse will not fit within smaller fuse slots of a lower ampacity fuse holder.

A further embodiment of the invention involves fuse terminal and fuse slots where the fuse terminals utilize different orientations. FIGS. 13a-15c illustrate embodiments that utilize a 'T' fuse terminal configuration. In an exemplary embodiment, the fuse terminals are perpendicular to each other.

Figure 13A:
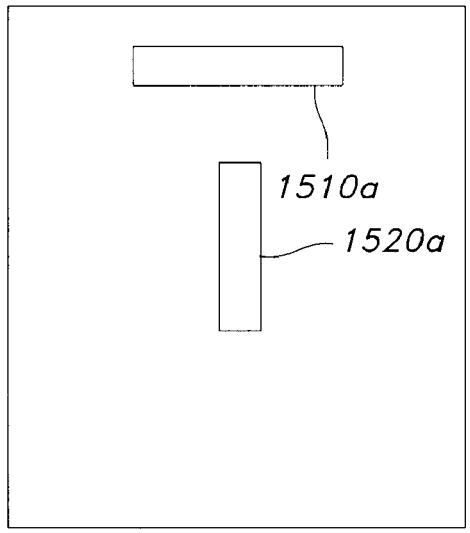
FIG. 13a illustrates a fuse with perpendicular fuse terminals of a first ampacity where the ampacity of the fuse is determined by the width of the horizontal fuse terminal according to one exemplary embodiment.
Figure 13B:
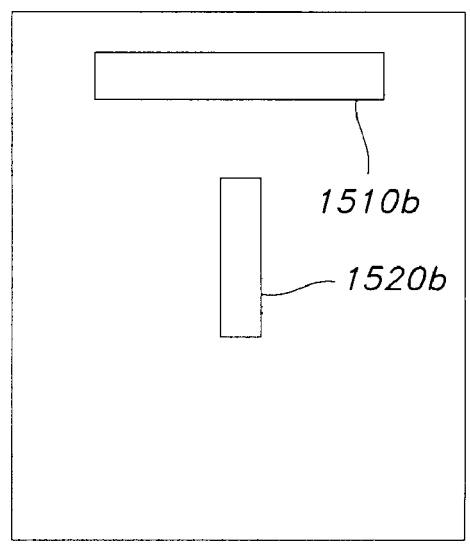
FIG. 13b illustrates a fuse with perpendicular fuse terminals of a second ampacity where the ampacity of the fuse is determined by the with of the horizontal fuse terminal according to one exemplary embodiment.
Figure 13C:
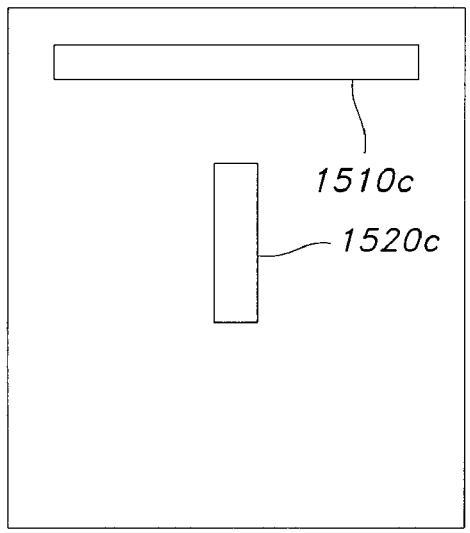
FIG. 13c illustrates a fuse with perpendicular fuse terminals of a third ampacity where the ampacity of the fuse is determined by the width of the horizontal fuse terminal according to one exemplary embodiment.
Figure 15A:
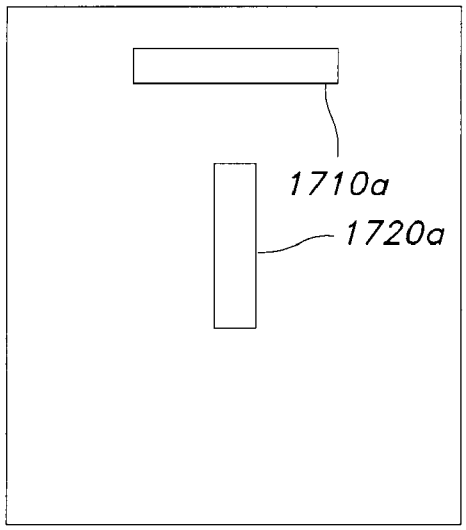
FIG. 15A illustrates a 40 A fuse with 40 A fuse terminals according to one exemplary embodiment.

FIGS. 13a-c illustrate an embodiment where the ampacity is determined by the dimensions of a horizontal fuse terminal 1510. FIG. 15a illustrates a fuse 1500a of a first ampacity with perpendicular fuse terminals 1510a, 1520a where the ampacity of the fuse is determined by the width of the horizontal fuse terminal 1510a according to one exemplary embodiment. FIG. 13b illustrates a fuse 1500b of a second ampacity with perpendicular fuse terminals 1510b, 1520b where the ampacity of the fuse 1500b is determined by the width of the horizontal fuse terminal 1510b according to one exemplary embodiment. FIG. 13c illustrates a fuse 1500c of a third ampacity with perpendicular fuse terminals 1510c, 1520c where the ampacity of the fuse 1500c is determined by the width of the horizontal fuse terminal 1510c according to one exemplary embodiment. The first ampacity is less then the second ampacity which is less than the third ampacity. As the ampacity increases, the width of the horizontal fuse terminals 1510a-c increases, and the width of the vertical fuse terminals 1520a-c remains constant. This configuration of a fuse terminal may make use of the same fuse holder system described previously, where a fuse holder may be sized to accept a fuse rated at the fuse holder's ampacity or a smaller ampacity, but not a larger ampacity.

Figure 14A:
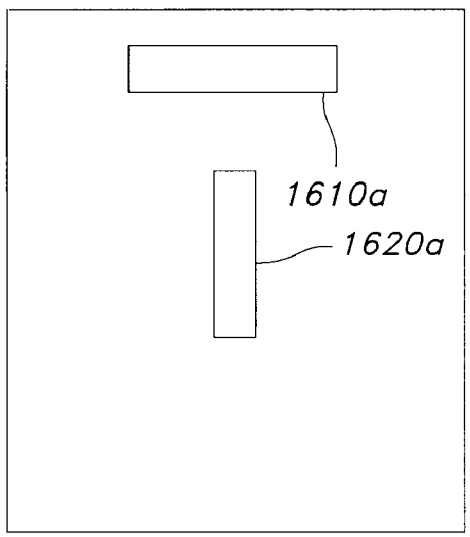
FIG. 14a illustrates a fuse with perpendicular fuse terminals of a first ampacity where the ampacity of the fuse is determined by the length of the vertical fuse terminal according to one exemplary embodiment.
Figure 14B:
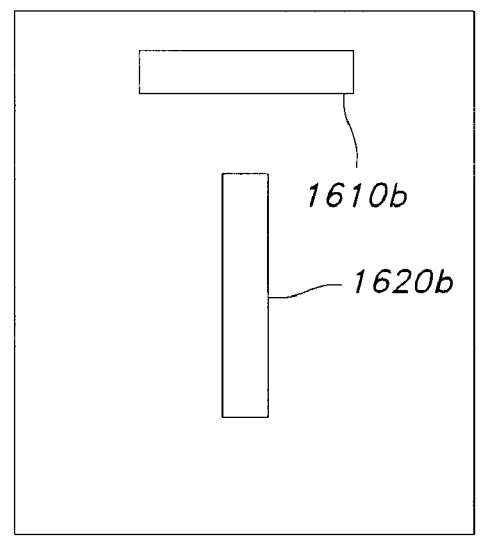
FIG. 14b illustrates a fuse with perpendicular fuse terminals of a second ampacity where the ampacity of the fuse is determined by the length of the vertical fuse terminal according to one exemplary embodiment.
Figure 14C:
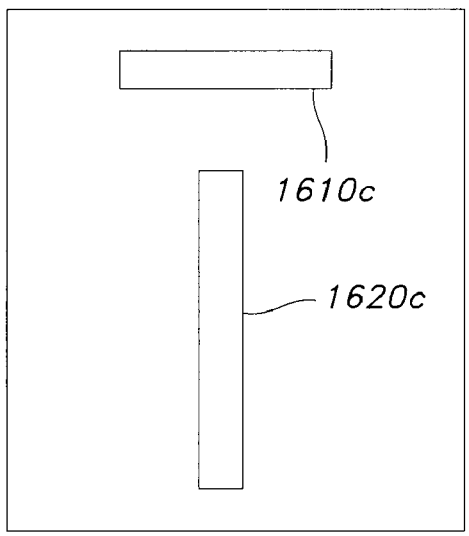
FIG. 14c illustrates a fuse with perpendicular fuse terminals of a third ampacity where the ampacity of the fuse is determined by the length of the vertical fuse terminal according to one exemplary embodiment.

FIGS. 14a-c illustrate an embodiment similar to FIGS. 13a-c, except that ampacity is determined based on the dimensions of the vertical fuse terminal 1620. FIG. 14a illustrates a fuse 1600a of a first ampacity with perpendicular fuse terminals 1610a, 1620a where the ampacity of the fuse 1600a is determined by the length of the vertical fuse terminal 1620a according to one exemplary embodiment. FIG. 14b illustrates a fuse 1600b of a second ampacity with perpendicular fuse terminals 1610b, 1620b where the ampacity of the fuse 1600b is determined by the length of the vertical fuse terminal 1620b according to one exemplary embodiment. FIG. 14c illustrates a fuse 1600c of a third ampacity with perpendicular fuse terminals 1610c, 1620c where the ampacity of the fuse 1600c is determined by the length of the vertical fuse terminal 1620c according to one exemplary embodiment. The first ampacity is less then the second ampacity which is less than the third ampacity. As the ampacity increases, the length of the vertical fuse terminals 1620a-c increases, and the width of the horizontal fuse terminals 1610a-c remains constant. This configuration of a fuse terminal may make use of the same fuse holder system described previously, where a fuse holder may be sized to accept a fuse rated at the fuse holder's ampacity or a smaller ampacity, but not a larger ampacity.

Figure 15B:
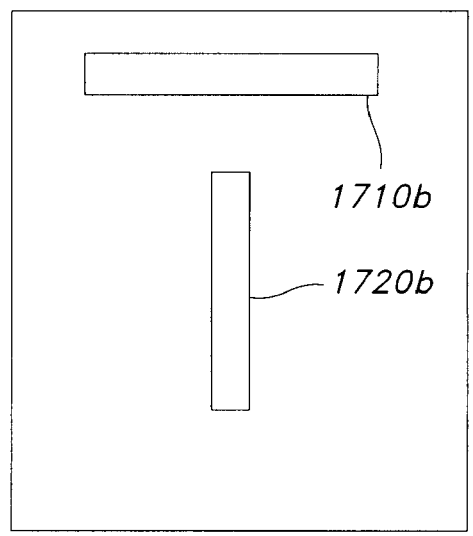
FIG. 15b illustrates a fuse with perpendicular fuse terminals of a second ampacity where the ampacity of the fuse is determined by the width of the horizontal fuse terminal and the length of the vertical fuse terminal according to one exemplary embodiment.
Figure 15C:
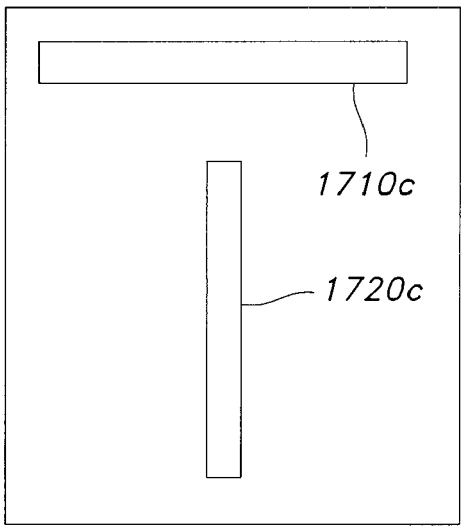
FIG. 15c illustrates a fuse with perpendicular fuse terminals of a third ampacity where the ampacity of the fuse is determined by the width of the horizontal fuse terminal and the length of the vertical fuse terminal according to one exemplary embodiment.

FIGS. 15a-c illustrate an embodiment incorporating the elements of FIGS. 13a-14c. FIG. 15a illustrates a fuse 1700a of a first ampacity with perpendicular fuse terminals 1710a, 1720a where the ampacity of the fuse 1700a is determined by the width of the horizontal fuse terminal 1710a and the length of the vertical fuse terminal 1720a according to one exemplary embodiment. FIG. 15b illustrates a fuse 1700b of a second ampacity with perpendicular fuse terminals 1710b, 1720b where the ampacity of the fuse 1700b is determined by the width of the horizontal fuse terminal 1710b and the length of the vertical fuse terminal 1720b according to one exemplary embodiment. FIG. 15c illustrates a fuse 1700c of a third ampacity with perpendicular fuse terminals 1710c, 1720c where the ampacity of the fuse 1700c is determined by the width of the horizontal fuse terminal 1710c and the length of the vertical fuse terminal 1720c according to one exemplary embodiment. The first ampacity is less then the second ampacity which is less than the third ampacity. As the ampacity increases, the length of the vertical fuse terminals 1720a-c increases, and the width of the horizontal fuse terminals 1710a-c increases. This configuration of a fuse terminal may make use of the same fuse holder system described previously, where a fuse holder may be sized to accept a fuse rated at the fuse holder's ampacity or a smaller ampacity, but not a larger ampacity.

Although illustrated as a perpendicular arrangement in FIGS. 13-15, the fuse terminals and slots can be arranged in any other suitable configuration. For example, one fuse terminal and slot can be angled with respect to the other fuse terminal and slot, or both fuse terminals and slots can be angled with respect to edges of the fuses and fuse holders.

Any spatial references herein such as, for example, "top," "bottom," "upper," "lower," "above," "below," "rear," "between," "vertical" "angular," "beneath," "side," "end," etc., are for the purpose of illustration only and do not limit the specific orientation or location of the described structure.

Therefore, the invention is well adapted to attain the ends and advantages mentioned as well as those that are inherent therein. The particular embodiments disclosed herein are illustrative only, as the invention may be modified and practiced in different but equivalent manners apparent to those having ordinary skill in the art having the benefit of the teachings herein. While numerous changes may be made by those having ordinary skill in the art, such changes are encompassed within the spirit and scope of the invention as defined by the appended claims. Furthermore, no limitations are intended to the details of construction or design herein illustrated, other than as described in the claims below. It is therefore evident that the particular illustrative embodiments disclosed herein may be altered or modified and all such variations are considered within the scope and spirit of the invention as defined by the claims below. The terms in the claims have their plain, ordinary meaning unless otherwise explicitly and clearly defined by the patentee.

What is claimed is:

1. A set of fuses, comprising:
    a first fuse having a first ampacity, the first fuse comprising
        a first casing, and
        a first pair of fuse terminals connected by a first fuse element and extending from the casing, the first fuse terminals defining a first area;
    a second fuse having a second ampacity, the second ampacity being less than the first ampacity, the second fuse comprising
        a second casing, and
        a second pair of fuse terminals connected by a second fuse element and extending from the second casing, the second fuse terminals defining a second area that is less than the first area, and the second fuse terminals being configured to be disposed within the area defined by the first fuse terminals; and
    a third fuse having a third ampacity, the third ampacity being less than the second ampacity, the third fuse comprising
        a third casing, and
        a third pair of fuse terminals connected by a third fuse element and extending from the third casing, the third fuse terminals defining a third area that is less than the second area, and the third fuse terminals being configured to be disposed within the area defined by the second fuse terminals.

2. The set of fuses according to claim 1, wherein a configuration of the first pair of fuse terminals and the second pair of fuse terminals each comprise a first fuse terminal oriented perpendicular to a second fuse terminal.

3. The set of fuses according to claim 1, wherein a configuration of the first pair of fuse terminals and the second pair of fuse terminals each comprise a first fuse terminal oriented parallel to a second fuse terminal.

4. The set of fuses according to claim 1, wherein a configuration of the first pair of fuse terminals and the second pair of fuse terminals each comprise a first fuse terminal and a second fuse terminal staggered from a fuse centerline.

5. The set of fuses according to claim 1, wherein a configuration of the first pair of fuse terminals and the second pair of fuse terminals each comprise a first fuse terminal and a second fuse terminal offset from a fuse centerline.

6. A set of fuse holders, comprising:
    a first fuse holder having a first ampacity, the first fuse holder comprising
        a first pair of fuse receiving receptacles, the first pair of fuse receiving receptacles defining a first area; and
    a second fuse holder having a second ampacity, the second ampacity being less than the first ampacity, the second fuse holder comprising
        a second pair of fuse receiving receptacles, the second pair of fuse receiving receptacles defining a second area that is less than the first area, and the second pair of fuse receiving receptacles being configured such that the second area corresponds to a portion of the first area.

7. The set of fuse holders according to claim 6, further comprising;
a third fuse holder having a third ampacity, the third ampacity being less than the second ampacity, the third fuse holder comprising
a third pair of fuse receiving receptacles, the third pair of fuse receiving receptacles defining a third area that is less than the second area, and the third pair of fuse receiving receptacles being configured such that the third area corresponds to a portion of the second area.

8. The set of fuse holders according to claim 6, wherein a configuration of the first pair of fuse receiving receptacles and the second pair of fuse receiving receptacles each comprise a first fuse receiving receptacle oriented perpendicular to a second fuse receiving receptacle.

9. The set of fuse holders according to claim 6, wherein a configuration of the first pair of fuse receiving receptacles and the second pair of fuse receiving receptacles each comprise a first fuse receiving receptacle oriented parallel to a second fuse receiving receptacle.

10. The set of fuse holders according to claim 6, wherein a configuration of the first pair of fuse receiving receptacles and the second pair of fuse receiving receptacles each comprise a first fuse receiving receptacle and a second fuse receiving receptacle staggered from a fuse holder centerline.

11. The set of fuse holders according to claim 6, wherein a configuration of the first pair of fuse receiving receptacles and the second pair of fuse receiving receptacles each comprise a first fuse receiving receptacle and a second fuse receiving receptacle offset from a fuse holder centerline.

12. A fuse system, comprising:
a first fuse and a first fuse holder each having a first ampacity, the first fuse comprising a first set of fuse terminals, the first fuse holder comprising a first set of fuse receiving receptacles, and the first set of fuse receiving receptacles being configured to receive the first set of fuse terminals of the first fuse;
a second fuse and a second fuse holder each having a second ampacity, the second ampacity being greater than the first ampacity, the second fuse comprising a second set of fuse terminals, the second fuse holder comprising a second set of fuse receiving receptacles, and the second set of fuse receiving receptacles being configured to receive the first set of fuse terminals of the first fuse and the second set of fuse terminals of the second fuse,
wherein the first set of fuse receiving receptacles of the first fuse holder prevent receiving the second set of fuse terminals of the second fuse; and
a third fuse and a third fuse holder each having a third ampacity, the third ampacity being greater than the second ampacity, the third fuse comprising a third set of fuse terminals, the third fuse holder comprising a third set of fuse receiving receptacles, and the third set of fuse receiving receptacles being configured to receive the first set of fuse terminals of the first fuse, the second set of fuse terminals of the second fuse, and the third set of fuse terminals of the third fuse,
wherein the first set of fuse receiving receptacles of the first fuse holder further prevent receiving the third set of fuse terminals of the third fuse, and
wherein the second set of fuse receiving receptacles of the second fuse holder prevent receiving the third set of fuse terminals of the third fuse.

13. A fuse system, comprising:
a first fuse and a first fuse holder each having a first ampacity, the first fuse comprising a first set of fuse terminals, the first fuse holder comprising a first set of fuse receiving receptacles, and the first set of fuse receiving receptacles being configured to receive the first set of fuse terminals of the first fuse;
a second fuse and a second fuse holder each having a second ampacity, the second ampacity being greater than the first ampacity, the second fuse comprising a second set of fuse terminals, the second fuse holder comprising a second set of fuse receiving receptacles, and the second set of fuse receiving receptacles being configured to receive the first set of fuse terminals of the first fuse and the second set of fuse terminals of the second fuse,
wherein the first set of fuse receiving receptacles of the first fuse holder prevent receiving the second set of fuse terminals of the second fuse;
wherein the first set of fuse terminals defines a first terminal area and the first set of the receiving receptacles defines a first receptacle area, the first terminal area corresponding to the first receptacle area, and
wherein the second set of fuse terminals defines a second terminal area and the second set of fuse receiving receptacles defines a second receptacle area, the second terminal area corresponding to the second receptacle area, the second terminal area being larger than the first terminal area, and the second receptacle area being larger than the first receptacle area, and wherein
the first terminal area corresponds to only a portion of the second receptacle area.

14. A fuse system, comprising:
a first fuse holder that accepts a first fuse, the first fuse holder and the first fuse having a first ampacity;
a second fuse holder that accepts a second fuse, the second fuse holder and the second fuse having a second ampacity, the second ampacity being greater than the first ampacity,
wherein the second fuse holder further accepts the first fuse, and
wherein the first fuse holder prevents accepting the second fuse; and
a third fuse holder that accepts a third fuse, the third fuse holder and the third fuse having a third ampacity, the third ampacity being greater than the second ampacity,
wherein the third fuse holder further accepts the first fuse and the second fuse,
wherein the first fuse holder further prevents accepting the third fuse, and
wherein the second fuse holder prevents accepting the third fuse.

15. The fuse system of claim 14, wherein the first fuse holder comprises a set of fuse receiving receptacles,
wherein the second fuse comprises a set of fuse terminals, and
wherein the first fuse holder prevents accepting the second fuse because a configuration of the set of receiving receptacles is different than a configuration of the set of fuse terminals.

16. The fuse system of claim 14, wherein the first fuse holder comprises a set of fuse receiving receptacles,
wherein the second fuse comprises a set of fuse terminals, and wherein the first fuse holder prevents accepting the second fuse because an area defined by the set of receiving receptacles is less than an area defined by set of fuse terminals.

17. The fuse system of claim 14, wherein the first fuse holder prevents accepting the second fuse because a size of a portion of a housing of the first fuse holder is smaller than a size of a corresponding portion of the second fuse.

18. The fuse system of claim 14, wherein the first fuse and the second fuse each include first and second terminal blades projecting from a casing.

19. The fuse system of claim 18, wherein the first and second terminal blades in each of the first fuse and the second fuse are offset from one another.

20. The fuse system of claim 18, wherein a width of the first and second terminal blades of the first fuse is different from a width of the first and second blades of the second fuse.

21. The fuse system of claim 18, wherein the first and second terminal blades extend perpendicular to one another.

22. The fuse system of claim 14, wherein the casing of the first fuse is substantially rectangular.

23. The fuse system of claim 22, wherein the casing of the first fuse projects from the housing of the first fuse holder and the second fuse holder when accepted.

24. The fuse system of claim 23, wherein the first fuse includes first and second terminal blades project from the casing, the first and second terminal blades being concealed in the first fuse holder and the second fuse holder when accepted.

25. The fuse system of claim 22 wherein the casing of the second fuse is substantially rectangular, the casings of the first and second fuse each being compatible with the first and second housings.

26. A set of fuses, comprising:
- a first fuse having a first ampacity, the first fuse comprising
  - a first casing, and
  - a first pair of fuse terminals connected by a first fuse element and extending from the casing, the first fuse terminals defining a first area; and
- a second fuse having a second ampacity, the second ampacity being less than the first ampacity, the second fuse comprising
  - a second casing, and
  - a second pair of fuse terminals connected by a second fuse element and extending from the second casing, the second fuse terminals defining a second area that is less than the first area, and the second fuse terminals being configured to be disposed within the area defined by the first fuse terminals;
- wherein a configuration of the first pair of fuse terminals and the second pair of fuse terminals each comprise a first fuse terminal and a second fuse terminal staggered from a fuse centerline.

* * * * *

UNITED STATES PATENT AND TRADEMARK OFFICE
CERTIFICATE OF CORRECTION

| | |
|---|---|
| PATENT NO. | : 7,825,766 B2 |
| APPLICATION NO. | : 12/179811 |
| DATED | : November 2, 2010 |
| INVENTOR(S) | : Matthew Rain Darr et al. |

It is certified that error appears in the above-identified patent and that said Letters Patent is hereby corrected as shown below:

In the Specification

In Column 3, Line 52, delete "15A" and insert therefor -- 10A --.

Signed and Sealed this
Twenty-second Day of October, 2013

Teresa Stanek Rea
*Deputy Director of the United States Patent and Trademark Office*